United States Patent [19]
Fogelberg

[11] Patent Number: 5,257,543
[45] Date of Patent: Nov. 2, 1993

[54] GEAR TRANSMISSION WITH AN ANTI-RATTLE SYSTEM

[75] Inventor: Mark J. Fogelberg, Loveland, Ohio

[73] Assignee: Borg-Warner Automotive, Inc., Sterling Heights, Mich.

[21] Appl. No.: 939,818

[22] Filed: Sep. 3, 1992

[51] Int. Cl.⁵ .............................................. F16H 55/18
[52] U.S. Cl. .......................................... 74/440; 74/409; 74/411.5
[58] Field of Search ............... 74/409, 440, 443, 411.5

[56] References Cited

U.S. PATENT DOCUMENTS

| | | | |
|---|---|---|---|
| 1,067,144 | 7/1913 | Schilling | 74/409 |
| 1,124,107 | 1/1915 | Bugatti | 74/409 |
| 1,629,564 | 5/1927 | White | 74/440 |
| 2,021,935 | 11/1935 | Griswold | 74/397 |
| 2,162,282 | 6/1939 | Leishman | 74/10.35 |
| 2,197,057 | 4/1940 | Oakley | 40/474 |
| 2,235,898 | 3/1941 | Niemeyer | 33/281 |
| 2,663,198 | 12/1953 | Cairnes | 74/409 |
| 2,679,167 | 5/1954 | Nichinson | 74/409 |
| 2,924,998 | 2/1960 | Sem et al. | 475/336 |
| 3,171,212 | 3/1965 | Michalec | 33/501.13 |
| 3,365,723 | 1/1968 | Spormann | 346/20 |
| 3,496,794 | 2/1970 | Forichon | 74/440 |
| 3,548,673 | 12/1979 | Suchocki | 74/409 |
| 3,581,593 | 6/1971 | Robinson | 74/443 |
| 3,636,789 | 1/1972 | Geiger | 74/409 |
| 3,638,511 | 2/1972 | Kirschner | 74/440 |
| 3,648,534 | 3/1972 | Fagarazzi | 74/440 |
| 3,763,432 | 10/1973 | Ham | 324/103 R |
| 3,995,498 | 12/1976 | Curchod et al. | 73/480 |
| 4,036,074 | 7/1977 | Bodmar | 74/409 |
| 4,236,448 | 12/1980 | Wieland | 101/216 |
| 4,273,995 | 6/1981 | Devanney | 235/139 R |
| 4,279,173 | 7/1981 | Krebs et al. | 74/441 |
| 4,433,590 | 2/1984 | Benoit et al. | 74/409 |
| 4,519,264 | 5/1985 | Inui | 74/409 |
| 4,532,818 | 8/1985 | Tanaka et al. | 74/10.33 |
| 4,577,525 | 3/1986 | Ikemoto et al. | 74/440 |
| 4,640,146 | 2/1987 | Buback | 74/359 |
| 4,640,147 | 2/1987 | Yasukawa et al. | 74/409 |
| 4,656,883 | 4/1987 | Bengtason | 74/411.5 |
| 4,660,432 | 4/1987 | Damas | 74/440 |
| 4,671,129 | 6/1987 | Lovrenich | 74/370 |
| 4,678,361 | 7/1987 | Steinkamper et al. | 403/359 |
| 4,700,582 | 10/1987 | Basette | 74/409 |
| 4,811,615 | 3/1989 | Rea | 74/375 |

*Primary Examiner*—Leslie A. Braun
*Assistant Examiner*—William O. Trousdell
*Attorney, Agent, or Firm*—Reising, Ethington, Barnard

[57] ABSTRACT

An anti-rattle system for a gear type transmission including a first part and a second part. One of the parts of the anti-rattle system includes a pair of deformable pressure discs with parallel facing flat surfaces. The flat surfaces of the pressure discs are in parallel planes that are perpendicular to an axis of rotation. The other part includes a friction disc with an outer periphery positioned between the parallel flat surfaces so that the pressure discs are deformed and spread apart by the friction disc. One of the parts is attached to a drive gear and another one of the parts is attached to a gear in mesh with the drive gear. Another one of the parts could also be attached to an anti-rattle assembly counter shaft.

15 Claims, 3 Drawing Sheets

GEAR TRANSMISSION WITH AN ANTI-RATTLE SYSTEM

FIELD OF THE INVENTION

The invention relates to an anti-rattle system for gear drives and more particularly to an anti-rattle system for a multi-ratio transmission with constant mesh gear sets.

BACKGROUND OF THE INVENTION

Multi-ratio transmissions commonly employ gear sets with gears that are always in mesh. Gear ratios may be selected in these transmissions by connecting one gear to a shaft by moving a slider. At any given time most of the gear sets have one gear which is free to rotate relative to the shaft upon which it is supported. When the gears of a gear set are being driven without transmitting torque, they may rattle, make objectionable noise, and may be damaged.

Two gears which mesh with each other generally have some backlash. Backlash is the amount the width of a gear tooth space exceeds the thickness of an engaging tooth on the pitch circle. Due to the machining process for producing transmissions, most gear sets have some backlash. Torsional vibrations excite the rotating gears causing them to vibrate within the range of backlash. This vibration within the range of the backlash creates gear rattle.

Various devices have been proposed to eliminate gear rattle. Some of the devices eliminate backlash. Other devices apply a small torque load that keeps gear teeth in contact and eliminates vibration. These devices are complex, require substantial space, reduce reliability, and add friction. Friction takes power, which is not available for useful work and generates heat that can lead to transmission failures.

SUMMARY

An object of the invention is to provide a quiet gear transmission.

Another object of the invention is to provide an anti-rattle assembly for a gear transmission which requires minimal space, minimizes power loss and is reliable.

A further object of the invention is to provide an anti-rattle assembly for a gear transmission that can be tailored to provide the required torque load without excessive power consumption.

Each anti-rattle assembly includes a first part that is attached to one rotating member and a second part attached to another rotating member. The first part includes a pair of pressure discs. The pressure discs are made of spring steel or other resilient material, and have parallel facing flat surfaces. The second part includes a friction disc with an outer periphery positioned between the parallel flat facing surfaces of the pair of pressure discs of the first part and deflects the pressure discs apart by deforming the pressure discs. One of the parts of the anti-rattle assemblies is attached to a transmission gear. The other part of the anti-rattle assemblies is connected to another transmission gear or to an anti-rattle assembly support shaft. A diameter of the friction disc is chosen that in combination with the pressure discs will try to frictionally drive a gear set or gear sets at a different speed than they are driven by the gear teeth. The friction disc slips relative to the pressure discs to limit the torque load placed on the gears by the anti-rattle assembly.

Further objects, features and other aspects of this invention will be understood from the detailed description of preferred embodiments of the invention.

DESCRIPTION OF THE PREFERRED EMBODIMENTS

There is backlash between two gears when the width of the space between two teeth on one gear exceeds the thickness of an engaging tooth on another gear on the pitch circles. The backlash is the distance which the width of the space between two teeth on one gear exceeds the thickness of an engaging tooth on another gear. Most gear drives have at least some backlash. When two gears transmit torque in one direction without vibration backlash is not a big problem. When there are torque reversals in a gear drive that exceed the torque output of the drive, the gears can oscillate relative to each other a distance equal to the backlash. Torque reversals that exceed the torque output can be induced by vibrations in a gear drive. These vibrations can be induced by the components of a machine that is driven by a gear train as well as the power source that transmits torque to the gear train.

Machines driven by gear trains may operate at reduced loads at least part of the time. Torsional vibrations in the drive train can cause gear oscillations during low torque output operation. Multi-ratio gear transmissions and reversible transmissions can have driven gears that transmit little or no torque most of the time. Constant mesh multi-ratio transmissions for example have gears that transmit torque only when one gear is locked to a shaft by a slider. Constant mesh gear trains in these transmission which do not include a gear that is locked to a shaft by a slider are driven but do not transmit torque. Torsional vibrations in these transmissions can cause gear oscillations in the gear trains that are not transmitting torque.

Gear oscillations that are the result of backlash and torsional vibrations cause noise. This noise is referred to as gear rattle. In vehicle transmissions gear rattle is very objectionable. It is generally objectionable in other gear transmissions as well. Gear rattle may also result in gear damage and eventually gear failure.

Figure 1:
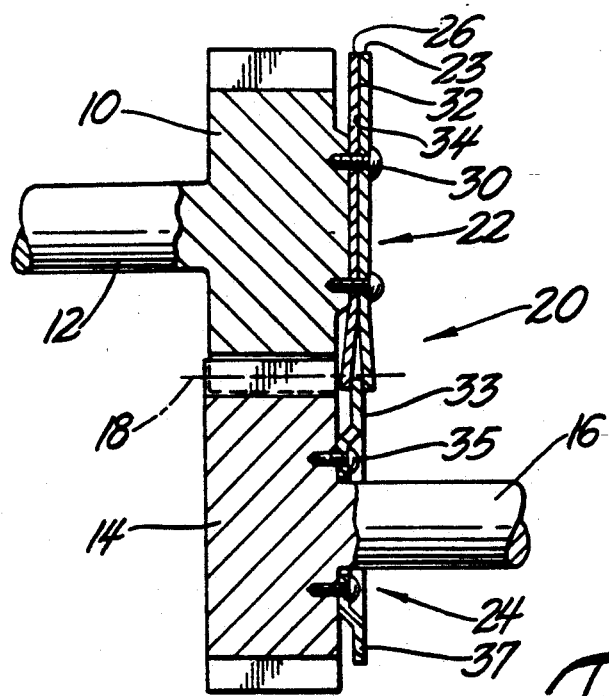
FIG. 1 is a side elevation, partially in section, of a drive gear, a driven gear and an attached anti-rattle assembly.

A driven gear 10 on a driven shaft 12 is shown in FIG. 1. The driven gear 10 is in mesh with a drive gear 14 mounted on a drive shaft 16. The pitch circles of the driven gear 10 and the drive gear 14 intersect along the line 18. The anti-rattle assembly 20 includes a first part 22 attached to the driven gear 10 and a second part 24 attached to the drive gear 14. The first part 22 includes two pressure discs 26 and 23 attached to the driven gear 10 by threaded fasteners 30. The pressure discs 26 and 23 have parallel facing flat surfaces 32 and 34 that are in a plane that is perpendicular to the axis of rotation of the driven gear 10. The second part 24 of the anti-rattle assembly 20 includes a friction disc 33 that is secured to the drive gear 14 by threaded fasteners 35. The outer periphery 37 of the friction disc 33 is positioned between the parallel facing flat surfaces 32 and 34 of the pressure discs 26 and 23 and deflects the pressure discs apart. The pressure discs 26 and 23 are made of spring steel or other resilient material that does not fail when it is deformed by the outer periphery 37 of the friction disc 32.

The friction disc 33 deforms both pressure discs 26 and 23 apart. When both pressure discs 26 and 23 are deformed the amount of deflection in each individual pressure disc 26 or 23 is minimized and the contacts between the pressure discs 26 and 23 and the friction disc 33 are uniform and relatively small. One of the pressure discs 26 or 23 could be a rigid member if desired and could even be the gear to which the resilient pressure disc is attached. To provide contact surfaces with a rigid pressure disc similar to the contact surfaces provided by the resilient pressure discs, as shown in FIG. 1, it would be necessary, or at least very desirable, to provide a conical surface on the rigid pressure disc rather than a flat surface. A flat surface on the rigid pressure disc may make it difficult to determine the drive ratio of the anti-rattle assembly and may result in a drive ratio that changes with changes in operating conditions such as temperature, lubrication, and speed.

The diameter of the friction disc 33 is slightly less than the diameter of the pitch circle of the drive gear 14 to which the friction disc is attached. The friction contact between the pressure discs 26 and 23 and the friction disc 33 transmits torque between the drive gear 14 and the driven gear 10 when the drive shaft 16 is rotated. Because the diameter of the friction disc 33 is less than the diameter of the pitch circle of the drive gear 14, as stated above, the pressure discs 26 and 23 and the friction disc 33 try to drive the driven gear 10 slower than it is driven by the drive gear 14. Because the gear teeth do not slip, there is slippage between the pressure discs 26, 23 and the friction disc 33. The forced slippage between the pressure discs 26 and 23 and the friction disc 33 imposes a frictionally generated load on the gears 10 and 14 which prevents them from moving back and forth through the backlash. The torque transmitted by the anti-rattle assembly 20 tends to retard rotation of the driven gear 10, and to prevent gear rattle when the torque transmitted through the two gears does not prevent gear rattle.

The driven gear 10 could become the drive gear and the drive gear 14 could become the driven gear. The anti-rattle assembly 20, as shown in FIG. 1, would then tend to rotate the driven gear faster than the driven gear is driven by the drive gear.

The friction disc 33 could have a larger diameter than the diameter of the pitch circle of the drive gear 14. If the friction disc 33 has a larger diameter than the pitch circle of the drive gear 14 the anti-rattle assembly 20 will tend to drive the driven gear 10 faster than it is driven by the gear teeth. The diameter of the pitch circle of the friction disc 33 is essentially the outside diameter of the friction disc 33 or possibly slightly less than the outside diameter of the friction disc 33.

Figure 2:
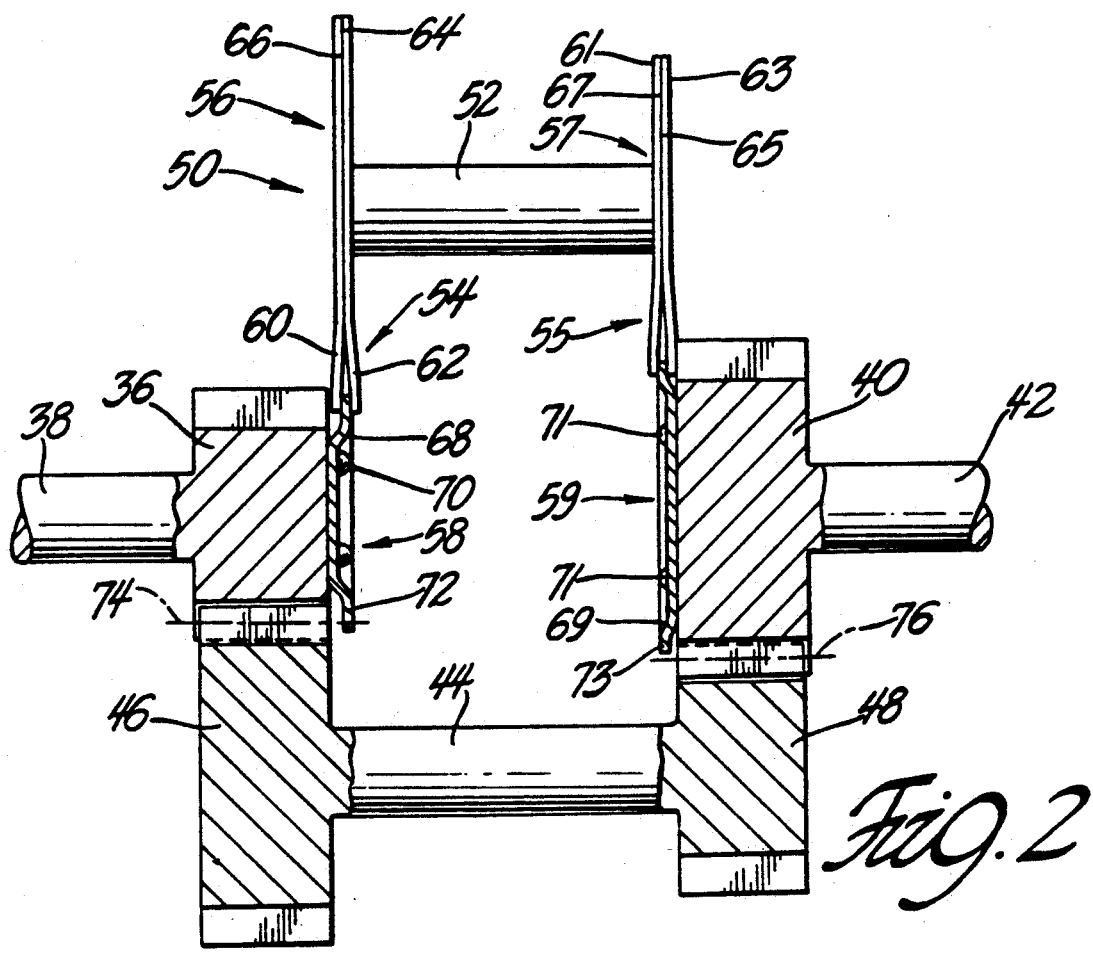
FIG. 2 is a schematic partially sectional view of a gear train with a drive gear, a driven gear, a counter shaft, a pair of gears on the counter shaft for transmitting torque from the drive gear to the driven gear and an attached anti-rattle assembly.

The gear train shown in FIG. 2 has a drive gear 36 on a drive shaft 38 and a driven gear 40 on an output shaft 42. The drive shaft 38 and the output shaft 42 are coaxial, as shown. A counter shaft 44 carries a driven gear 46 that meshes with the drive gear 36 and a drive gear 48 that meshes with the driven gear 40. The counter shaft arrangement provides four gears 36, 46, 48 and 40 for providing the desired drive ratio. The counter shaft arrangement also makes it possible to change the speed and torque in a drive with coaxial drive and output shafts. The anti-rattle system 50 includes an anti-rattle counter shaft 52 rotatably supported adjacent to the drive shaft 38 and the output shaft 42 and a pair of anti-rattle assemblies 54 and 55. The anti-rattle assembly 54 includes a first part 56 attached to the anti-rattle counter shaft 52 and a second part 58 attached to the drive gear 36. The first part 56 includes two pressure discs 60 and 62 attached to the anti-rattle counter shaft 52. The pressure discs 60 and 62 have parallel facing flat surfaces 64 and 66 that are in planes that are perpendicular to the axis of rotation of the anti-rattle counter shaft 52. The second part 58 of the anti-rattle assembly 54 includes a friction disc 68 that is secured to the drive gear 36 by threaded fasteners 70. The outer periphery 72 of the friction disc 68 is positioned between the parallel flat surfaces 64 and 66 of the pressure discs 60 and 62 and deflects the pressure discs apart.

The other anti-rattle assembly 55 includes a first part 57 attached to the anti-rattle counter shaft 52 and a second part 59 attached to the driven gear 40. The first part 57 includes two pressure discs 61 and 63 that have parallel facing flat surfaces 65 and 67 that are in planes that are perpendicular to the axis of rotation of the anti-rattle counter shaft 52. The second part 59 of the anti-rattle assembly 55 includes a friction disc 69 that is secured to the driven gear 40 by threaded fasteners 71. The outer periphery 73 of the friction disc 69 is positioned between the parallel flat surfaces 65 and 67 of the pressure discs 61 and 63 and deflect the pressure discs apart.

The pitch circles of the drive gear 36 and the driven gear 46 intersect along the line 74. The pitch circles of the drive gear 48 and the driven gear 40 intersect along the line 76. The diameters of the friction discs 68 and 69 may be larger than, the same as, or smaller than the pitch diameter of the gears 36 or 40 to which they are attached, so long as the diameters of the pressure discs 60 and 62 and the pressure discs 61 and 63 are chosen such that the combined drive ratio of the anti-rattle assemblies 54 and 55 is slightly different than the combined gear ratio of the gears 36, 46, 48 and 40. The location of the anti-rattle counter shaft 52, the diameter of the pressure discs 60 and 62, the diameter of the pressure discs 61 and 63, and the diameters of the friction discs 68 and 69 can be varied substantially depending on the space available.

The anti-rattle system 50 as shown in FIG. 2 can be used where there is insufficient space available for the pressure discs 60 and 62 on the driven gear 46 and where there is insufficient space available for the pressure discs 61 and 63 on the drive gear 48. The employment of an anti-rattle counter shaft 52 provides the designer of an anti-rattle system substantial design flexibility. Clearly however, two anti-rattle assemblies 20, as shown in FIG. 1, could be used with the gear train, shown in FIG. 2, if desired.

Figure 3:
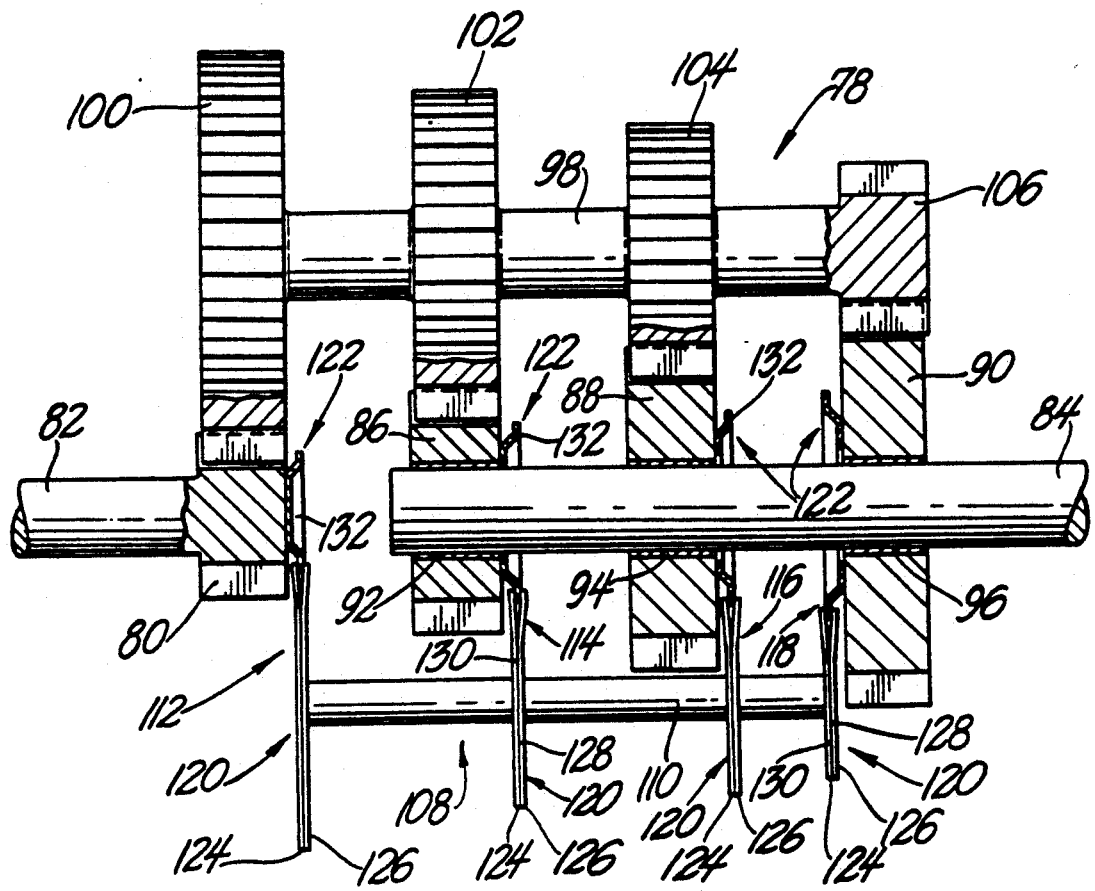
FIG. 3 is a schematic sectional view of a gear train with a drive gear, three driven gears, a counter shaft, gears on the counter shaft for transmitting torque from the drive gear to the driven gear and an attached anti-rattle assembly.

A multi-ratio transmission 78 with constant mesh gears, is shown in FIG. 3. As shown, the transmission 78 has three different drive ratios. A reverse gear train is not shown but could be added if desired. The multi-ratio transmission 78 has a drive pinion or gear 80 on a drive shaft 82. An output shaft 84, as shown is coaxial with the drive shaft 82. Three driven gears 86, 88 and 90 are rotatably journaled on the output shaft 84 by bearings 92, 94 and 96. Drive between the drive shaft 82 and the output shaft 84 is established by employing sliders that can be manipulated to selectively lock the gears 86, 88 or 90 to the output shaft 84. Sliders may be combined with synchronizers and are well known in the art. Most vehicle transmissions with manual shifting, that are manufactured today, have constant mesh gears and synchronizers. Sliders and synchronizers have not been shown in the drawing to eliminate confusion and because they are well known in the art. U.S. Pat. No. 4,640,146 to Bubak, which is incorporated herein by reference discloses sliders that could be employed to lock the gears 86, 88 and 90 to the output shaft 84 if desired. Synchronizers can be employed with the sliders or shift collars if desired.

A counter shaft 98 is supported for rotation about an axis that is parallel to the axes of rotation of the drive shaft 82 and the output shaft 84. A driven gear 100 is secured to the counter shaft 98 and meshes with drive gear 80 on the drive shaft 82. Drive gear 102 on the counter shaft 98 meshes with driven gear 86, drive gear 104 on the counter shaft meshes with driven gear 88, and drive gear 106 on the counter shaft meshes with driven gear 90. The driven gears 86, 88 or 90 are in constant mesh with the drive gears 102, 104 and 106 respectively.

An anti-rattle system 108 is provided to prevent the drive gears 102, 104 and 106 and the driven gears 86, 88 and 90 from rattling. The anti-rattle system 108 includes an anti-rattle counter shaft 110 rotatably supported at one side of the drive shaft 82 and the output shaft 84 and four anti-rattle assemblies 112, 114, 116 and 118. Each of the anti-rattle assemblies 112, 114, 116 and 118 includes a first part 120 attached to the anti-rattle counter shaft 110 and a second part 122. The first part 120 includes two pressure discs 124 and 126 attached to the anti-rattle counter shaft 110. The pressure discs 124 and 126 have parallel flat surfaces 128 and 130 that are in planes that are perpendicular to the axis of rotation of the anti-rattle counter shaft 110. The second part 122 of each anti-rattle assembly 112, 114, 116 and 118 includes a friction disc 132. The friction disc 132 of the anti-rattle assembly 112 is secured to drive gear 80 by suitable fasteners. The friction discs 132 of the anti-rattle assemblies 114, 116 and 118 are each secured to one of the driven gears 86, 88 and 90. The outer peripheries of the friction discs 132 are positioned between the parallel flat surfaces 128 and 130 of the pressure discs 124 and 126 and deflect the pressure discs apart.

The drive ratio of the anti-rattle assemblies 112 and 114 is different than the gear ratio of the gears 80, 100, 102 and 86. The drive ratio of the anti-rattle assemblies 112 and 116 is different than the gear ratio of the gears 80, 100, 104 and 88. The drive ratio of the anti-rattle assemblies 112 and 118 is also different than the gear ratio of the gears 80, 100, 106 and 90.

Figure 4:
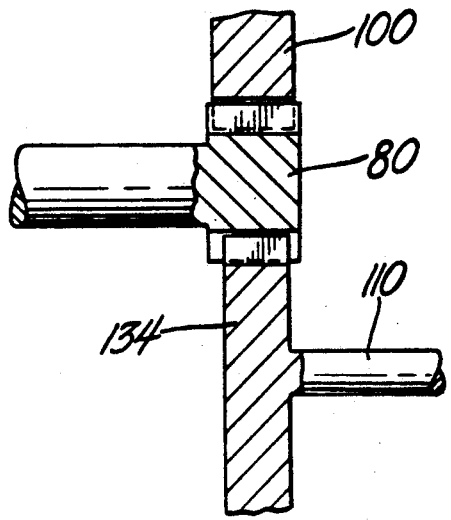
FIG. 4 is a schematic sectional view of a modification for the anti-rattle assembly shown in FIG. 3.

Drive ratios of the anti-rattle assemblies 114, 116 and 118 can be chosen, for many anti-rattle systems 108, that will not overload the anti-rattle assembly 112 that drives the anti-rattle counter shaft 110. In multi-ratio transmissions 78 that are designed to transmit large torque loads, the driven gears 86, 88 and 90 are large and have high inertia. These high inertia transmissions and transmissions with multiple gear ratios may require more driving torque for the anti-rattle counter shaft 110 than the anti-rattle assembly 112 can provide. In these transmissions it may be necessary to provide a gear 134 on the anti-rattle counter shaft 110, as shown in FIG. 4, that is in mesh with the drive gear 80 and drives the anti-rattle counter shaft 110.

Figure 5:
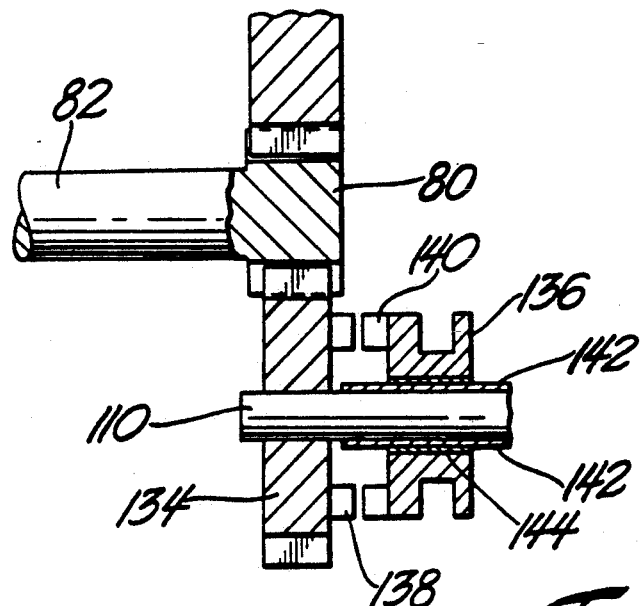
FIG. 5 is another schematic sectional view of another modification for the anti-rattle assembly shown in FIG. 3.

The friction drive between the friction discs 132 and the pressure discs 124 and 126, as shown in FIG. 3 must slip because of the variations between the drive ratios of the anti-rattle assemblies 112, 114, 116 and 118 and the gear ratios of the gears in the multi-ratio transmission 78. This slippage generates heat and places a torque load on the drive gear 82. Under some conditions it may be desirable to remove the torque load added to the multi-ratio transmission 78. The torque load can be reduced by rotatably mounting the gear 134 on the anti-rattle counter shaft 110, as shown in FIG. 5. The gear 134 rotates anytime the drive gear 80 and the drive shaft 82 are driven. With the slider 136 positioned to the right, as shown in FIG. 5, the gear 134 rotates freely on the anti-rattle counter shaft 110. When the slider 136 is moved to the left, the dogs 138 on the gear 134 engage the dogs 140 on the slider 136 and the anti-rattle counter shaft 110 rotates with the gear 134. The slider 136 can move axially but can not rotate on the anti-rattle counter shaft 110. Rotation of the slider 136 is prevented by the key members 142 on the anti-rattle counter shaft 110 which are received in key ways 144 in the slider 136.

The anti-rattle assemblies, shown in FIGS. 1, 2 and 3 are substantially identical in function and operation. The differences are in the gear drives to which the anti-rattle assemblies are attached. Gear drives with an idler gear require more substantial changes in the anti-rattle assemblies.

Figure 6:
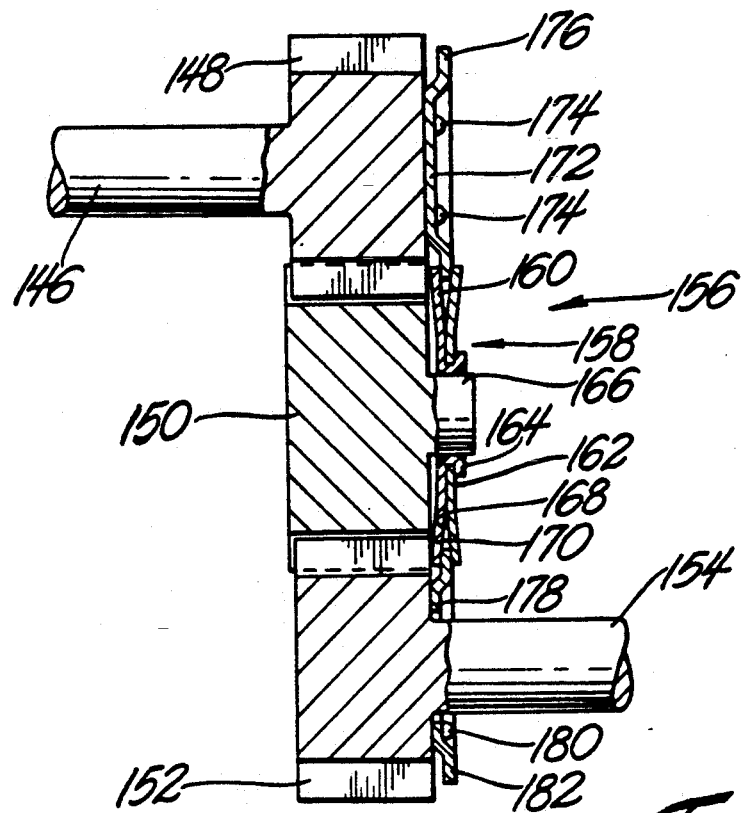
FIG. 6 is a schematic side elevation, partially in section of a drive gear, a driven gear, an idler gear in mesh with the drive gear and the driven gear and an attached anti-rattle assembly.

The gear drive shown in FIG. 6 includes a drive shaft 146, a drive gear 148, an idler gear 150, a driven gear 152 and a driven shaft 154. The drive shaft 146 transmits torque to the drive gear 148 to the idler gear 150, to the driven gear 152 and to the driven shaft 154. The idler gear 150 is employed to rotate the driven shaft 154 in the same direction that the drive shaft 146 rotates. The gear drive shown in FIG. 1 rotates the driven shaft 12 in the opposite direction from the drive shaft 16. The engagement between the teeth on the drive gear 148 and the idler gear 150 can rattle as well as the engagement between the teeth on the idler gear and the teeth on the driven gear 152.

The anti-rattle assembly 156, for use with a gear train that includes an idler gear 150, has a pressure disc assembly 158 with two pressure discs 160 and 162. The pressure disc 160 includes a central flange 164. The central flange 164 rotatably supports the pressure disc assembly 158 on the idler gear support shaft 166 and clamps the pressure disc 162 to the pressure disc 160. The two pressure discs 160 and 162 have parallel facing flat surfaces 168 and 170 that are normally in planes that are perpendicular to the axis of rotation of the idler gear support shaft 166. A friction disc 172 is secured to the drive gear 148 by threaded fasteners 174. The outer periphery 176 of the friction disk 172 is positioned between the parallel facing flat surfaces 168 and 170 of the pressure discs 160 and 162 and deflects the pressure discs apart. A friction disc 178 is secured to the driven gear 152 by threaded fasteners 180. The outer periphery 182 of the friction disc 178 is positioned between the parallel facing flat surfaces 168 and 170 of the pressure discs 160 and 162 and deflects the pressure discs apart. It should be noted that the flat surfaces 168 and 170, as shown in FIG. 6 have been deformed and deflected out of flat parallel planes by the friction discs 172 and 178.

The friction disc 172 has a diameter that is less than the diameter of the pitch circle of the drive gear 148. The friction disc 178 has a diameter that is slightly larger than the diameter of the pitch circle of the driven gear 152. As a result, the anti-rattle assembly 156 tries to drive the driven gear 152 slower than it is driven by the drive sprocket 148. This tendency of the anti-rattle assembly 156, to retard the movement of the driven sprocket 52, maintains contact between the teeth of the idler gear 150 and the drive gear 148 and between the teeth of the idler gear 150 and the driven gear 154.

The anti-rattle assemblies have been described in combination with a variety of different gear drives. It will be understood by those skilled in the art that variations and modifications to the anti-rattle assemblies, which are within the scope of the invention, can be made to fit the anti-rattle assemblies to gear trains, in addition to those disclosed.

I claim:

1. A gear transmission including a drive shaft with an axis of rotation; a drive gear mounted on the drive shaft and rotatable about the axis of rotation of the drive shaft; a driven shaft with an axis of rotation; a driven gear mounted on the driven shaft, and in mesh with the drive gear; a pair of pressure discs, at least one of which is a resilient material, attached to one of said gears with adjacent facing flat surfaces that are perpendicular to the axis of rotation about which they rotate and with radially inner portions that are axially fixed relative to each other; a friction disc, attached to the other gear, having a diameter which is different than the pitch diameter of said other gear to which said friction disc is attached and having an outer edge positioned between the pair of pressure discs attached to one of said gears, deflecting a radially outer portion of at least one of said pressure discs away from the other pressure disc and wherein the friction disc frictionally engages the pressure discs attached to the one of said gears and tries to drive the driven gear at a different speed than the driven gear is rotated by the driving gear.

2. The gear transmission of claim 1 wherein both pressure discs are resilient material and wherein the friction disc deflects both pressure discs away from each other in the area where the friction disc is between the pressure discs.

3. A gear transmission including a drive shaft with an axis of rotation; at least one drive gear mounted on the drive shaft and rotatable about the axis of rotation of the drive shaft; a driven shaft with an axis of rotation; at least one driven gear mounted on the driven shaft and rotatable about the axis of rotation of the driven shaft; a counter shaft with an axis of rotation; a plurality of gears mounted on the counter shaft, rotatable about the axis of the counter shaft and in mesh with drive and driven gears on the drive shaft and the driven shaft; an anti-rattle assembly support shaft with an axis of rotation spaced from the drive shaft and the driven shaft; and a plurality of anti-rattle assemblies and with a first part including a pair of pressure discs, at least one of which is resilient material, and having parallel facing flat surfaces and wherein radially inner portions of said pair of pressure discs are axially fixed relative to each other, a second part including a friction disc with an outer periphery positioned between the parallel facing flat surfaces of the pair of pressure discs and deflecting the pressure discs apart by deforming at least one of the pressure discs and wherein one of the parts of the anti-rattle assemblies is attached to each of the driven and driving gears and wherein the other part of the anti-rattle assemblies is attached to the anti-rattle assembly support shaft and the anti-rattle assemblies try to drive the at least one driven gear at a different speed than the at least one driven is rotated by the driving gear.

4. The gear transmission, as set forth in claim 3, wherein both of the pressure discs, of the first part of the anti-rattle assemblies, are resilient material and the friction disc of the second part of the anti-rattle assemblies deflects both pressure discs away from each other in the area where the friction disc is between both pressure discs.

5. A gear transmission including a drive shaft with an axis of rotation, at least one drive gear mounted on the drive shaft and rotatable about the axis of rotation of the drive shaft; a driven shaft with an axis of rotation; at least one driven gear mounted on the driven shaft and rotatable about the axis of rotation of the driven shaft; a counter shaft with an axis of rotation; a plurality of gears mounted on the counter shaft and in mesh with the drive and driven gears on the drive shaft and the driven shaft; an anti-rattle counter shaft with an axis of rotation spaced from the drive shaft and the driven shaft; at lease one anti-rattle assembly with a first part including a pair of pressure discs, at least one of which is resilient material, and having parallel facing flat surfaces and wherein radially inner portions of said pair of pressure discs are axially fixed relative to each other, a second part including a friction disc with an outer periphery positioned between the parallel facing flat surfaces of the pair of pressure discs and deflecting the pressure discs apart by deforming at least one of the pressure discs and wherein one of the parts of the at least one anti-rattle assembly is attached to a driven gear on the driven shaft and the other part of the at least one anti-rattle assembly is attached to the anti-rattle counter shaft; and a drive assembly a connected to the drive shaft and the anti-rattle assembly counter shaft for rotating the anti-rattle assembly counter shaft and wherein the anti-rattle assembly tries to drive the driven gear at a different speed than it is driven by the drive gear and the counter shaft gears.

6. A gear transmission as set forth in claim 5 wherein the drive assembly for rotating the anti-rattle assembly counter shaft is an anti-rattle assembly.

7. A gear transmission, as set forth in claim 6, wherein the drive assembly for rotating the anti-rattle assembly counter shaft is a gear that is mounted on the anti-rattle assembly counter shaft and in mesh with the drive gear on the drive shaft.

8. A gear transmission as set forth in claim 6 including a plurality of driven gears rotatably mounted on the driven shaft; gears on the counter shaft each of which is in mesh with one of the driven gears on the driven shaft; an anti-rattle assembly connected to each driven gear and to the anti-rattle assembly counter shaft.

9. A gear transmission as set forth in claim 8 wherein the drive assembly for rotating the anti-rattle assembly counter shaft is an anti-rattle assembly.

10. A gear transmission, as set forth in claim 8, wherein the drive assembly for rotating the anti-rattle assembly counter shaft is a gear that is mounted on the anti-rattle assembly counter shaft and in mesh with the drive gear on the drive shaft.

11. A gear transmission as set forth in claim 10 wherein the gear, that is mounted on the anti-rattle assembly counter shaft and in mesh with the drive gear on the drive shaft, is rotatably journaled on the anti-rattle assembly counter shaft and includes a slider on the anti-rattle assembly counter shaft which can be slid to one position to prevent rotation between the anti-rattle assembly counter shaft and the gear rotatably journaled on the anti-rattle assembly counter shaft and can be slid to another position to allow rotation between the anti-rattle assembly counter shaft and the gear rotatably journaled on the anti-rattle assembly counter shaft.

12. A gear transmission including a drive shaft with an axis of rotation; a drive gear mounted on the drive shaft and rotatable about the axis of rotation of the drive shaft; a driven shaft with an axis of rotation; a driven gear mounted on the driven shaft and rotatable about the axis of rotation of the driven shaft; an idler gear in mesh with the drive gear and the driven gear and rotatable about an axis of rotation; and an anti-rattle assembly for transmitting torque between the drive gear and the driven gear including one or more first parts each of which has a pair of pressure discs with parallel facing flat surfaces and wherein radially inner portions of said pair of pressure discs are axially fixed relative to each other, and one or more second parts each of which has a friction disc with an outer periphery positioned between the parallel facing flat surfaces of a pair of pressure discs and deflecting the pressure discs apart by deforming at least one of the pressure discs, and wherein the anti-rattle assembly tries to drive the driven gear at a different speed than the driven gear is driven by the drive gear and the idler gear.

13. A gear transmission as set forth in claim 12 wherein the anti-rattle assembly includes one first part rotatable about the axis of rotation of the idler gear, a second part secured to the drive gear and another second part secured to the driven gear.

14. A gear transmission as set forth in claim 13 wherein the anti-rattle assembly includes one second part rotatable about the axis of rotation of the idler gear, a first part secured to the drive gear and another first part secured to the driven gear.

15. A gear transmission as set forth in claim 13 wherein both pressure discs are deflected apart and deformed by a friction disc.

* * * * *